United States Patent
Hasegawa et al.

(10) Patent No.: US 6,779,564 B2
(45) Date of Patent: Aug. 24, 2004

(54) METHOD AND APPARATUS FOR SETTING A HELICAL COMPRESSION SPRING

(75) Inventors: Keiji Hasegawa, Toyoake (JP); Shinsuke Okura, Nagoya (JP)

(73) Assignee: Chuo Hatsujo Kabushiki Kaisha, Nagoya (JP)

( * ) Notice: Subject to any disclaimer, the term of this patent is extended or adjusted under 35 U.S.C. 154(b) by 0 days.

(21) Appl. No.: 10/321,600

(22) Filed: Dec. 18, 2002

(65) Prior Publication Data

US 2003/0116219 A1 Jun. 26, 2003

(30) Foreign Application Priority Data

Dec. 20, 2001 (JP) ........................................ 2001-388471

(51) Int. Cl.[7] .............................................. B21F 35/00
(52) U.S. Cl. ........................................ 140/89; 148/580
(58) Field of Search ............................ 140/89; 148/508, 148/580, 645

(56) References Cited

U.S. PATENT DOCUMENTS

| | | | | |
|---|---|---|---|---|
| 3,311,733 | A | * 3/1967 | Bitzer, Jr. ................ | 219/50 |
| 4,186,039 | A | * 1/1980 | Bache et al. ............. | 148/510 |
| 6,346,157 | B1 | 2/2002 | Takezawa et al. | |
| 2002/0046587 | A1 | 4/2002 | Hasegawa | |

FOREIGN PATENT DOCUMENTS

| JP | 10-237546 A | 9/1998 |
|---|---|---|
| JP | 2000-345238 A | 12/2000 |

OTHER PUBLICATIONS

Satoshi Suzuki et al., "Approaches to Minimizing Side Force of Helical Coil Springs in Suspension Design," *Japan Society for Spring Research*, Article No. 41, 1996, pp. 19–26.

* cited by examiner

*Primary Examiner*—Lowell A. Larson
(74) *Attorney, Agent, or Firm*—Burns, Doane, Swecker & Mathis, L.L.P.

(57) ABSTRACT

The present invention is directed to method for setting a formed helical compression spring. At the out set, parameters are measured to determine a reaction force axis of a formed helical compression spring. Next, A target reaction force axis of the spring is compared with the reaction force axis determined by the measured parameters to provide an error between the target reaction force axis and the detected reaction force axis. Then, a tilt angle of at least one of the compression plates tilted to an end plane of the spring is provided, in at least one direction on a plane including a coil axis of the spring, on the basis of the error between the target reaction force axis and the detected reaction force axis. Then, at least one of the compression plates is actuated to pressurize the spring, with at least one of the compression plates tilted to the end plane of the spring by the tilt angle.

12 Claims, 8 Drawing Sheets

FIG. 7

| TILT ANGLE | MOUNTING LOAD | | SPRING CONSTANTS | |
|---|---|---|---|---|
| | (N) | RATIO TO "0°" (%) | (N/mm) | RATIO TO "0°" (%) |
| 20° | 3983 | -1.6 | 26.0 | 1.4 |
| 15° | 3998 | -1.2 | 25.8 | 0.3 |
| 10° | 4011 | -0.9 | 25.7 | 0.0 |
| 5° | 4028 | -0.5 | 25.6 | -0.5 |
| 0° | 4048 | 0.0 | 25.7 | 0.0 |
| -5° | 4056 | 0.2 | 25.6 | -0.4 |
| -10° | 4062 | 0.3 | 25.4 | -1.2 |
| -15° | 4069 | 0.5 | 25.4 | -1.1 |
| -20° | 4078 | 0.8 | 25.1 | -2.4 |

METHOD AND APPARATUS FOR SETTING A HELICAL COMPRESSION SPRING

This application claims priority under 35 U.S.C. Sec. 119 to a patent application No. 2001-388471 filed in Japan on Dec. 20, 2001, the entire content of which is incorporated herein by reference.

BACKGROUND OF THE INVENTION

1. Field of the Invention

The present invention relates to a method for setting a helical compression spring and an apparatus for setting the same, and more particularly to the method and apparatus for setting a formed helical compression spring by placing the formed helical compression spring between a pair of compression plates, and pressurizing the formed helical compression spring, to produce a helical compression spring specially for use in a vehicle suspension system.

2. Description of the Related Arts

Various helical compression springs have been known heretofore. Among them, there is a helical compression spring which is designed to provide a coil axis that does not coincide with a direction of reaction force of the spring. For example, there is a helical compression springs for use in the vehicle suspension system, which has a reaction force axis inclined at a predetermined angle so as to lie on a predetermined position of an upper end coil or a lower end coil. When producing that spring, it is required to obtain a predetermined reaction force axis.

As for a conventional process for producing the helical spring, there are known a cold working process for forming a steel coil wire at a room temperature, and a hot working process for heating the coil wire to form it. The former method is disclosed in Japanese Patent Laid-open Publication No. 2000-345238, for example, and the latter method is disclosed in Japanese Patent Laid-open Publication No. H10-237546, for example. Neither Publications describe adjusting the reaction force axis.

One of the inventors of the present application filed a U.S. patent application Ser. No. 09/976,158 on Oct. 15, 2001, which was published on Apr. 25, 2002 as Publication No. US-2002-0046587-A1, in which an invention of a method and apparatus for producing a compression spring was proposed. According to this method, a compression spring having a predetermined reaction force axis can be produced by the cold working process. In the case where the compression spring is produced by the hot working process, however, it is difficult to form the spring in a desired coiling shape, so that it is not easy to adjust the reaction force axis. Furthermore, after the compression spring is produced, and thereafter a reaction force axis of the finished product is measured, provided that the conditions for hot working are modified so as to clear an error between a target reaction force axis and the reaction force axis of the finished product, it will take a quite long time to produce the spring due to unnecessary steps required for doing so. In addition, it will be required to produce a large number of springs at once in the same conditions, and it will be almost impossible to modify them on a product by product basis.

In the above-described Japanese Patent Laid-open Publication No. 2000-345238, there is disclosed a hot setting process for applying a predetermined load on a coil spring in a higher temperature condition than a room temperature, to compress and hold it. It was noticed by the present inventors that the reaction force axis could be adjusted, with a desired spring property maintained, by controlling the hot setting process as described later. According to this process, the reaction force axis could be adjusted, by means of hot setting process (or, warm setting process), after the compression spring was formed by the hot working process as described before, while it had been difficult to adjust the reaction force axis. However, the reaction force axis could not be adjusted, by means of a conventional hot setting process (i.e., prior hot setting process), which would cause a large deformation to result in a large dispersion of the reaction force axis.

SUMMARY OF THE INVENTION

Accordingly, it is an object of the present invention to provide a method for setting a helical compression spring, by placing a formed helical compression spring between a pair of compression plates, and pressurizing the formed helical compression spring, so that the compression spring could be adjusted to provide a desired reaction force axis.

It is another object of the present invention to provide an apparatus for setting a formed helical compression spring to provide a desired reaction force axis.

In accomplishing the above and other objects, a method for setting a helical compression spring is performed by placing the formed helical compression spring between a pair of compression plates, tilting at least one of the compression plates by a predetermined angle to an end plane of the spring, and actuating at least one of the compression plates to pressurize the spring.

The method may include the steps of (1) a measuring step for measuring parameters to detect a reaction force axis of the formed helical compression spring, (2) a determination step for comparing a target reaction force axis of the spring with the reaction force axis detected on the basis of measured parameters to provide an error between the target reaction force axis and the detected reaction force axis, (3) a tilt angle providing step for providing a tilt angle of at least one of the compression plates tilted to an end plane of the spring, in at least one direction on a plane including a coil axis of the spring, on the basis of the error provided at the determination step, and (4) a pressure step for actuating at least one of the compression plates to pressurize the spring, with at least one of the compression plates tilted to the end plane of the spring by the tilt angle provided at the tilt angle providing step.

In the method, the tilt angle providing step may be adapted to provide a first tilt angle of at least one of the compression plates tilted to an end plane of the spring, in one direction on one plane including the coil axis of the spring, and a second tilt angle of the one of the compression plates tilted to the end plane of the spring, in the other direction on a plane perpendicular to the one plane, on the basis of the error provided at the determination step. And, the pressure step may be adapted to actuate at least one of the compression plates to pressurize the spring, with at least one of the compression plates tilted to the end plane of the spring by the first and second tilt angles provided at the tilt angle providing step.

In the method as described above, it is preferable to pressurize the formed spring between the compression plates, in such a condition that the formed spring is heated within a predetermined temperature range.

An apparatus for setting a formed helical compression spring includes a measuring device for measuring parameters to determine a reaction force axis of the formed helical compression spring, a determination device for comparing a target reaction force axis of the spring with the reaction force axis determined by the measured parameters to provide an error between the target reaction force axis and the detected reaction force axis, a tilt angle providing device for providing a tilt angle of at least one of the compression plates tilted to an end plane of the spring, in at least one direction on a plane including a coil axis of the spring, on the basis of the error provided at the determination device, and a pressure device for actuating at least one of the compression plates to pressurize the spring, with at least one of the compression plates tilted to the end plane of the spring by the tilt angle provided at the tilt angle providing device.

In the apparatus, the tilt angle providing device may be adapted to provide a first tilt angle of at least one of the compression plates tilted to an end plane of the spring, in one direction on one plane including the coil axis of the spring, and a second tilt angle of the one of the compression plates tilted to the end plane of the spring, in the other direction on a plane perpendicular to the one plane, on the basis of the error provided at the determination device. And, the pressure device may be adapted to actuate at least one of the compression plates to pressurize the spring, with at least one of the compression plates tilted to the end plane of the spring by the first and second tilt angles provided at the tilt angle providing device.

In the apparatus as described above, it is preferable to pressurize the formed spring between the compression plates, in such a condition that the formed spring is heated within a predetermined temperature range.

BRIEF DESCRIPTION OF THE DRAWINGS

The above stated object and following description will become readily apparent with reference to the accompanying drawings, wherein like reference numerals denote like elements, and in which:

FIG. 7 is a table showing variation of mounting loads and variation of spring constants in response to variation of a tilt angle of a compression plate, according to an embodiment of the present invention.

DESCRIPTION OF THE PREFERRED EMBODIMENTS

Figure 1:
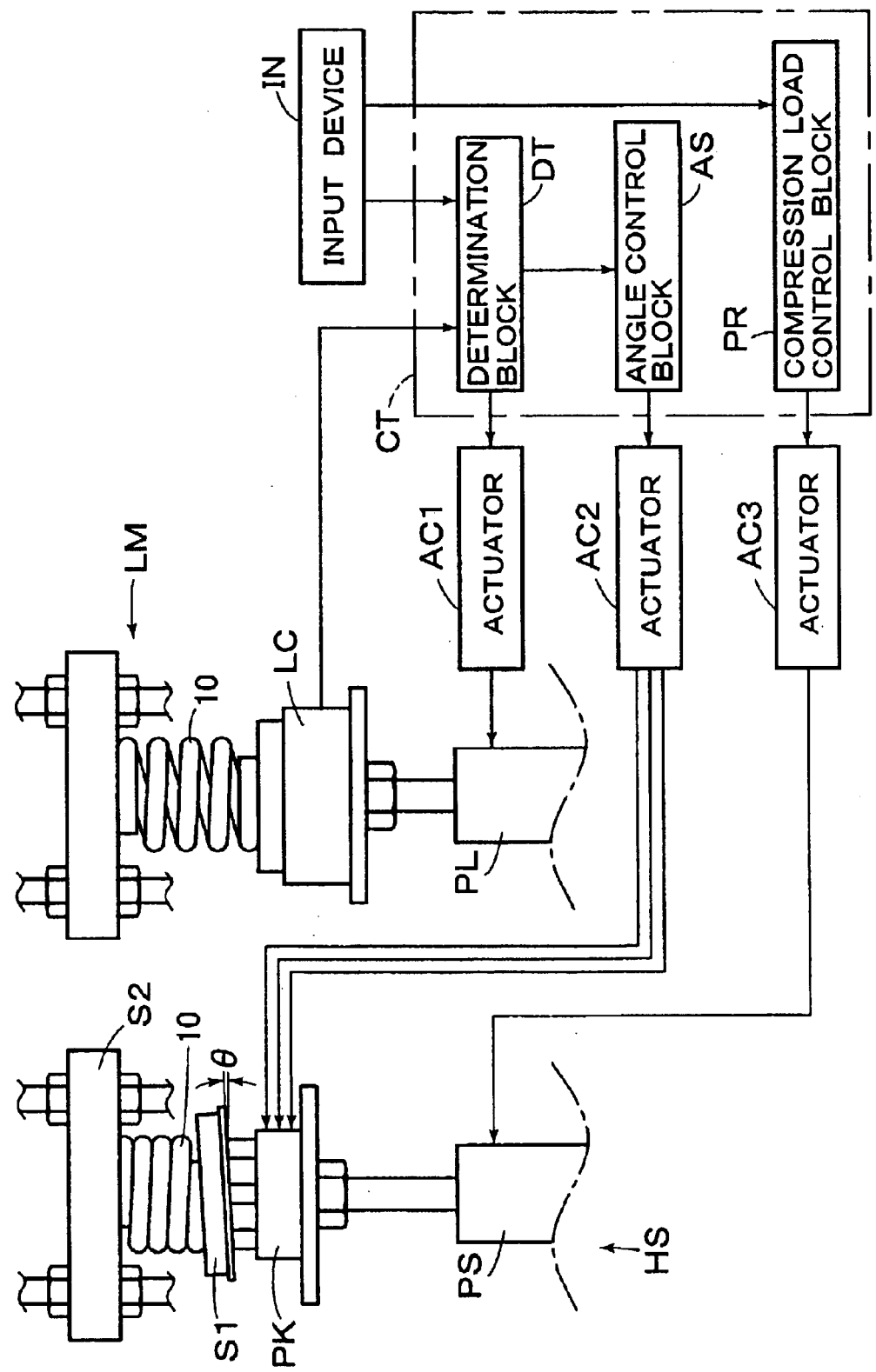
FIG. 1 is a schematic view of a machine for setting a helical compression spring according to an embodiment of the present invention.

Referring to FIG. 1, there is schematically illustrated an apparatus for setting a helical compression spring according to an embodiment of the present invention. A load measuring device LM is provided for measuring loads exerted on a plurality of positions of a formed helical compression spring 10 when a predetermined compression load is applied to the formed helical compression spring 10. The load measuring device LM is, for example, of a type as shown in pages 20 and 21 of the article "Approaches to Minimizing Side Force of Helical Coil Springs in Suspension Design" (in Article No. 41 (1996) of Japan Society for Spring Research), the content of which is incorporated herein by reference. In practice, six load cells are placed around the compression spring 10 to detect the loads when the spring 10 is pressurized between parallel plates, and the detected data are processed by a computer (not shown) to provide a side force, offset amount of load and offset position.

With respect to the load measuring device LM according to the present embodiment, the above-described load cells are indicated by a load cell LC in FIG. 1, and the data detected by the load cell LC are fed to a determination block DT which is constituted in a controller CT to serve as a determination device, and in which the reaction force axis of the compression spring 10 is detected. In accordance with the result of the determination block DT, an actuator AC1 is driven to actuate a pressure cylinder PL, so as to control a timing and compression load, when the compression spring 10 is pressurized between parallel plates. The determination block DT is constituted in the controller CT to receive various parameters (e.g., data indicative of a target reaction force axis) for setting the compression spring 10, from an input device IN.

According to the determination block DT, the reaction force axis of the compression spring 10 is detected on the basis of the results measured by the load measuring device LM, and the detected reaction force axis is compared with the target reaction force axis to provide an error between the axes. In the controller CT, an angle control block AS is constituted to provide a tilt angle (e.g., θ) of at least one of compression plates S1 and S2 tilted to an end plane of the spring 10 (i.e., the plate S1 in this embodiment), in at least one direction on a plane including a coil axis of the spring 10, on the basis of the error provided by the determination block DT. On the basis of the tilt angle (θ) provided by the angle control block AS, the compression plate S1 is tilted by an actuator AC2.

As a pressure device for pressurizing the compression spring 10 as described above, a tilt setting device HS is placed in parallel with the load measuring device LM. In the present embodiment, the formed compression spring 10 is measured by the load measuring device LM and transferred to the tilt setting device HS, where a hot tilt setting process is executed, in such a condition that the spring 10 is heated within a predetermined temperature range (heating device is omitted herein). In the tilt setting device HS, it is so constituted that the formed compression spring 10 is placed between the compression plates S1 and S2 to be pressurized by a pressure cylinder PS. The pressure cylinder PS is actuated by an actuator AC3, which is controlled by a compression load control block PR in the controller CT, so as to provide a predetermined compression load in accordance with the data provided by the input device IN. The pressure cylinders PS and PL are constituted by an air pressure cylinder or an oil pressure cylinder, while they may be constituted by electric motors.

According to the present embodiment, the compression plate S is supported by a servo device PK, which is actuated by the actuator AC2 to hold the compression plate S1 in a tilted condition by the tilt angle (θ) provided by the angle control block AS. The servo device PK includes electric motors, or air pressure (oil pressure) cylinders, which are adapted to apply the compression load to the lower end coil plane of the compression spring 10 at three positions, in the directions as indicated by F1–F3 in FIG. 2, together with the pressure cylinder PS. According to the present embodiment, it is so constituted that the compression load is applied to the compression plate S1 by both of the pressure cylinder PS and the servo device PK. The compression load may be applied only by the servo device PK, which is to be controlled by the compression load control block PR.

Figure 2:
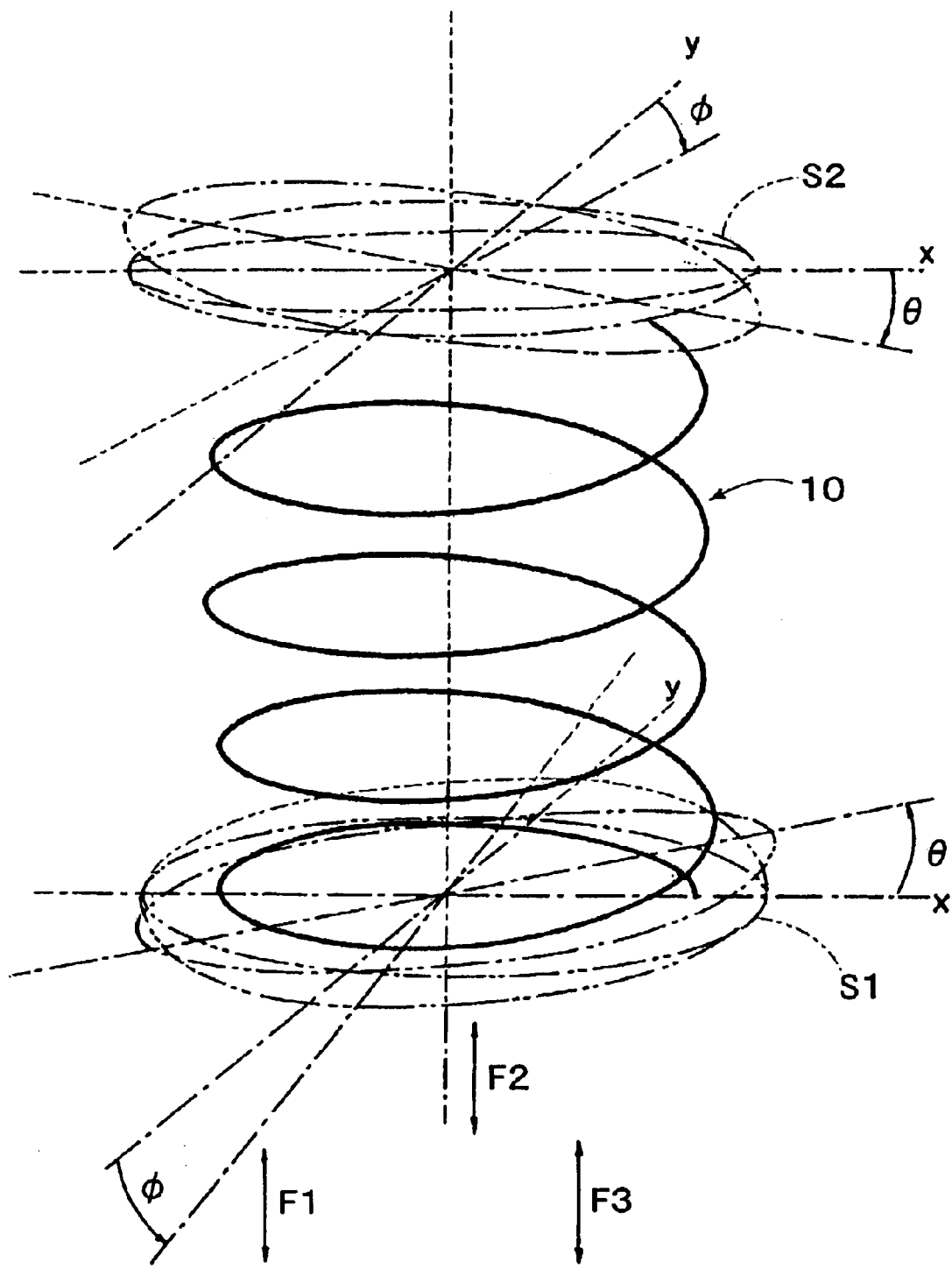
FIG. 2 is a perspective view of a helical compression spring with its end plane compressed, in accordance with a method for setting the compression spring according to an embodiment of the present invention.

In FIG. 1, there is disclosed an example where the compression plate S1 is held to be in a tilted state by the tilt angle (θ). In addition, by means of the servo device PK, the compression plate S1 may be held to be in a tilted state by a tilt angle (φ) in a direction perpendicular to the direction of the tilt angle (θ). That is, the tilt angles (θ, φ) in two directions may be provided by the angle control block AS, so that the compression plate S may be held to be in a tilted state by the tilt angles (θ, φ). Furthermore, if the compression plate S2 is constituted to be actuated, the compression plate S2 and the upper end coil plane of the compression spring 10 may be held to be in a tilted state by the tilt angles (θ, φ), as shown in FIG. 2.

Figure 3:
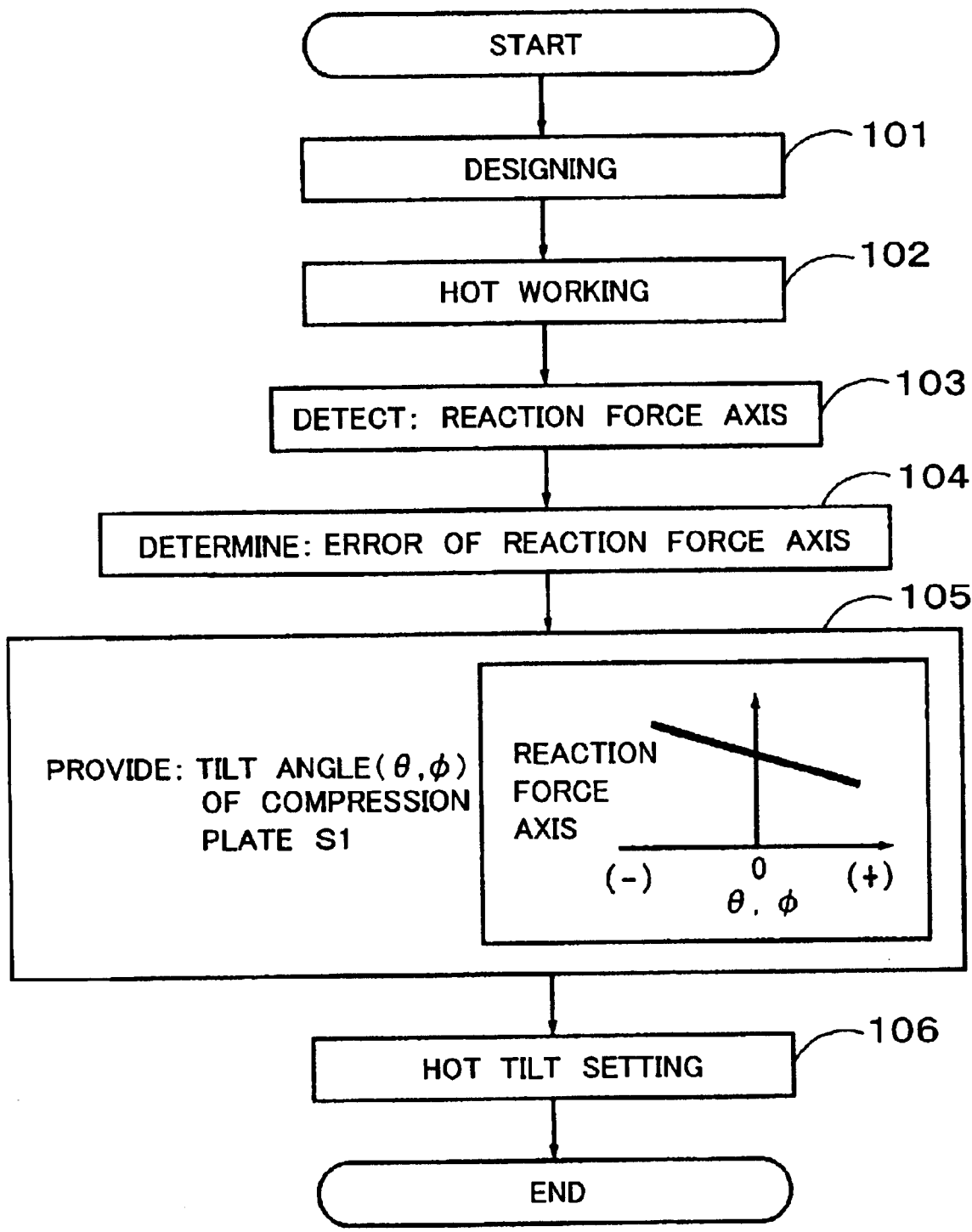
FIG. 3 is a flow chart showing a method for manufacturing a helical compression spring, including a method for setting the compression spring according to an embodiment of the present invention.

Referring to FIG. 3, will be explained a process for producing the compression spring, including an operation of the setting apparatus of the present embodiment. At the outset, a target compression spring is designed at Step 101, data indicative of its configuration are input to a controller (not shown) of a coiling machine (not shown). At the same time, a target reaction force axis of the target compression spring is input to the determination block DT by the input device IN. Then, the hot working process is executed at Step 102 to provide the compression spring 10 as shown in FIG. 2. Although the hot working process for forming the compression spring 10 was employed in this embodiment to provide a large effect by the tilt setting, the cold working process may be employed to produce the compression spring.

Then, the program proceeds to Step 103 where the compression spring 10 formed by the hot working process is transferred to the load measuring device LM, which drives the actuator AC1 to actuate the pressure cylinder PL, so that the compression spring 10 is pressurized between the parallel plates by a predetermined load. The data measured by the load cell LC are input to the determination block DT as shown in FIG. 1, by which the reaction force axis of the compression spring 10 is detected. This reaction force axis is compared with the target reaction force axis provided by the input device IN, to determine the error between them. Then, on the basis of the error provided at the determination block DT, the tilt angle (θ and/or φ) of the compression plate S1 to the lower end plane of the compression spring 10 is provided at Step 105. The tilt angles (θ, φ) are set to provide the reaction force axis for canceling the error, on the basis of a map for indicating a relationship between the tilt angle and a value required to modify the target value as shown in Step 105. The relationship between the tilt angles (θ, φ) and the reaction force axis is provided on the basis of a simulation as described later, or actual measurement, and stored in the controller CT as a data base.

Accordingly, the program proceeds to Step 106 where the hot tilt setting process is executed by the tilt setting device HS. That is, the formed compression spring 10 is heated within the predetermined temperature range, and the servo device PK is controlled to drive the actuator AC2, which actuates the compression plate S1 to be tilted. Consequently, the compression cylinder PS is actuated by the actuator AC3, so that the compression spring 10 is pressurized in a heated condition to produce the compression spring 10 having the target reaction force axis, with the error cancelled.

The tilt angles (θ, φ) of the compression plate S1 may be adjusted for each compression spring 10, while they may be adjusted every predetermined number of compression springs with errors similar to each other. In other words, the measuring step, determination step and tilt angle providing step may be executed once in a predetermined number of operations of the pressure step. Furthermore, the measurement of the reaction force axis has not necessarily to be made by the load measuring device LM on an on-line basis. Instead, various adjustments for each compression spring may be made in advance on an off-line basis, and the hot tilt setting may be performed in the same condition at a mass-production step to follow. In other words, the measuring step, determination step and tilt angle providing step may be executed in advance, and thereafter the pressure step may be repeatedly executed.

Figure 4:
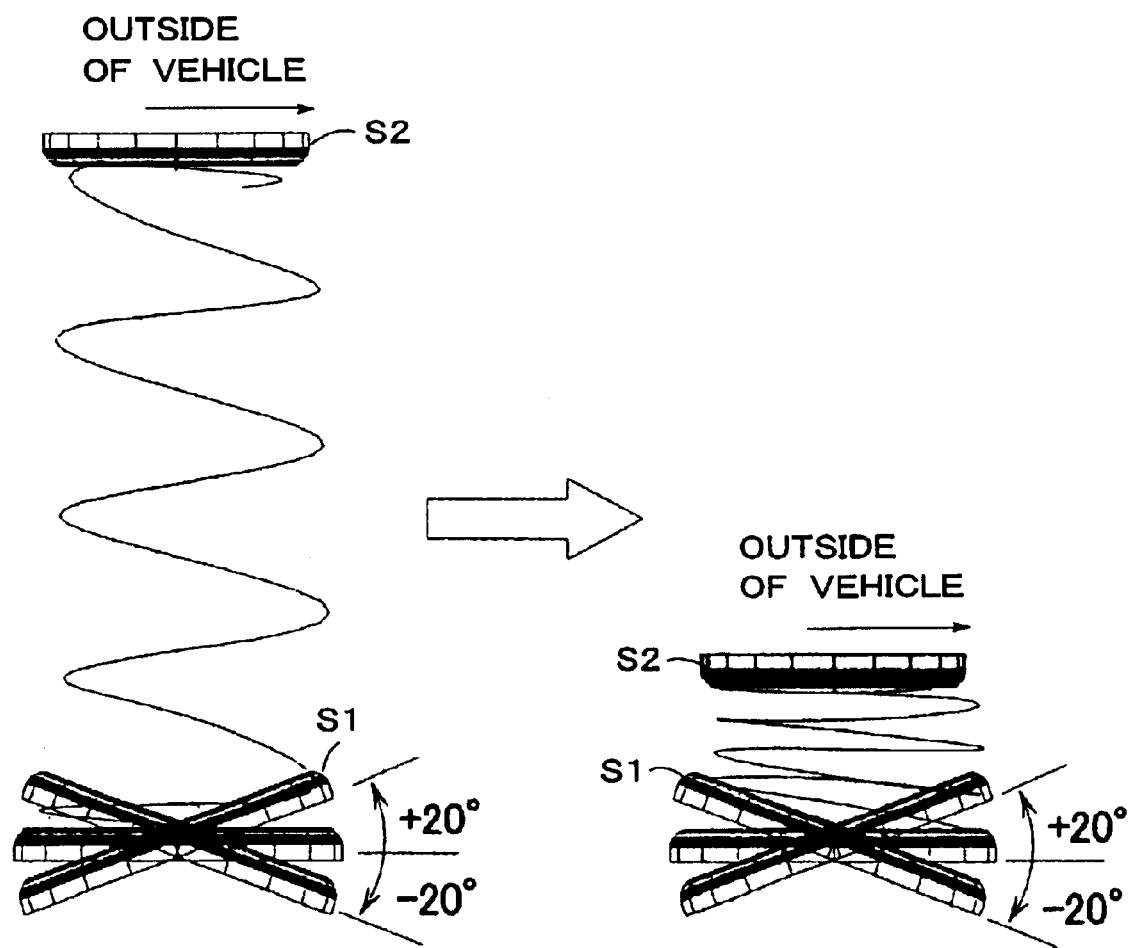
FIG. 4 is a front view showing compression plates and a helical compression spring, before and after a simulation of hot setting process is made to the compression spring according to an embodiment of the present invention.
Figure 5:
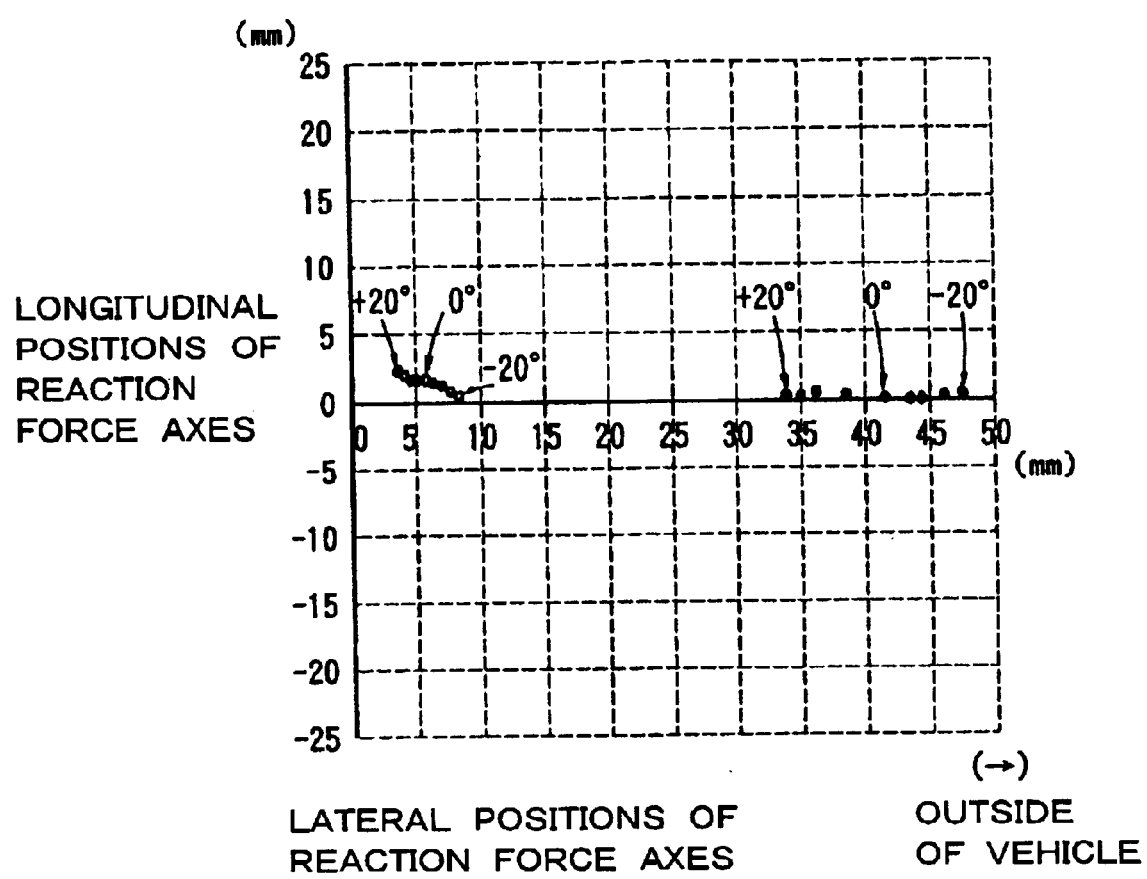
FIG. 5 is a diagram showing a variation of load offsets when a compression plate is tilted, as a result of analyzing a helical compression spring, with a hot setting simulation made thereto, according to an embodiment of the present invention.
Figure 6:
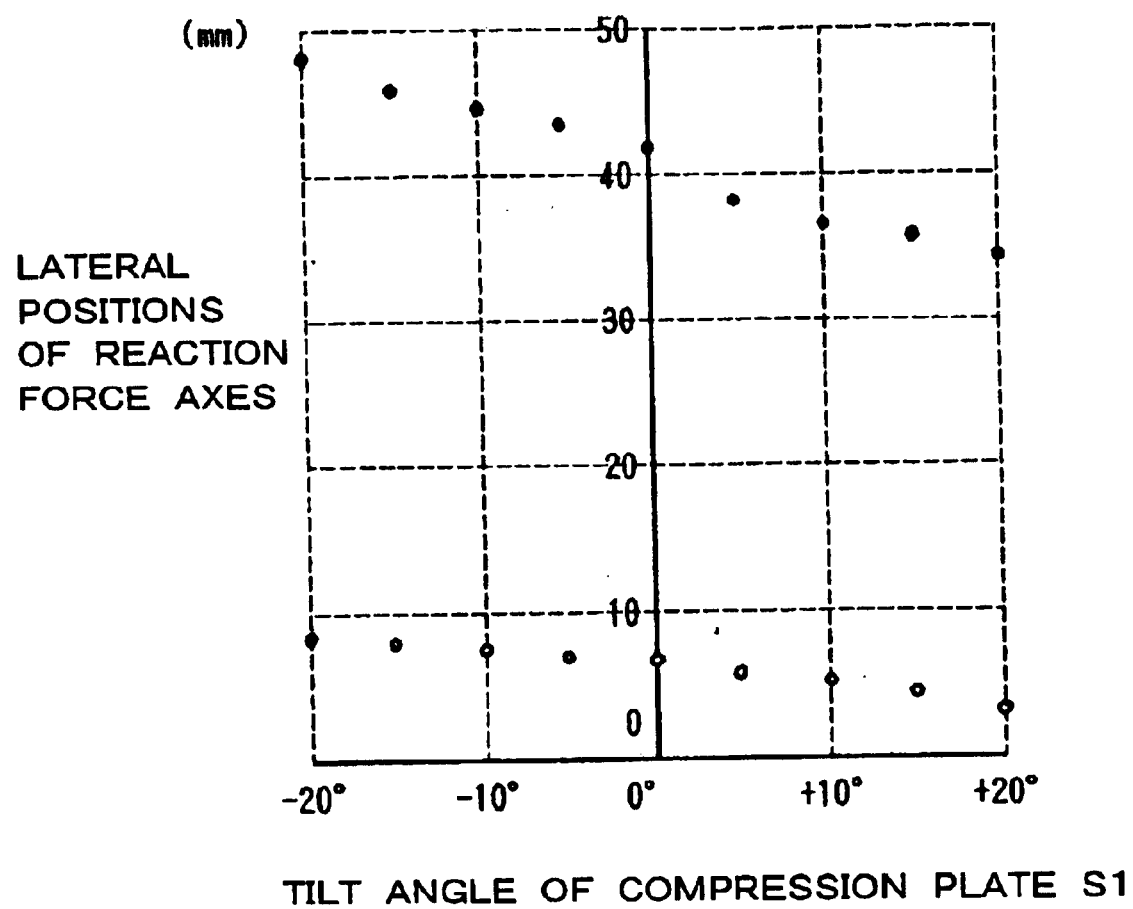
FIG. 6 is a diagram showing a relationship between a tilt angle of a compression plate and load offsets, as a result of analyzing a helical compression spring, with a hot setting simulation made thereto, according to an embodiment of the present invention.

FIGS. 4–6 show an example of a simulation for obtaining a relationship between the reaction force axis and tilt angle, in order to make the data base provided for use at the Step 105. The compression spring 10 according to the present embodiment is used for a vehicle suspension system, with the outside of the vehicle directed rightward in FIG. 4. As shown at the left side in FIG. 4, after the compression spring 10 is formed by the hot working process, it is placed between the compression plates S1 and S2, and the compression plate S1 for supporting the lower end plane of the spring 10 is tilted in a lateral direction (inside and outside) of the vehicle by +20 degree (vehicle outside corresponds upward in FIG. 4) to −20 degree (vehicle outside corresponds downward in FIG. 4), with 5 degree interval. Then, as shown at the right side in FIG. 4, the simulation for the hot setting process is executed (full compression load is applied to it in the heated condition), so that the analyzed result through FEM analysis is obtained as shown in FIGS. 5 and 6.

FIG. 5 shows a variation of the positions of the reaction force axes at the upper end plane of the compression spring 10, when the compression spring 10 formed by the hot setting process as described heretofore is tilted by +20 degree to −20 degree, with 5 degree interval. In FIG. 5, white spots indicate the positions of the reaction force axes on the upper end plane of the compression spring 10, whereas normal black spots indicate the positions of the reaction force axes on the lower end plane of the compression spring 10. The vertical axis in FIG. 5 indicates offset amounts (mm) of the positions of the reaction force axes to the center of the end coil in the longitudinal direction (back and forth) of a vehicle. As apparent from FIG. 5, when the compression plate S1 is tilted in the lateral direction of the vehicle, the positions of the reaction force axes are varied in approximately only lateral direction, without being remote largely from the central horizontal axis.

FIG. 6 shows tilt angles (degrees) of the compression plate S1 on the horizontal axis, and offset amounts (mm) of the positions of the reaction force axes to the center of the end coil in the lateral direction of the vehicle. In FIG. 6, the variation of offset amounts of the positions (indicated by white spots) of the reaction force axes on the upper end plane in the lateral direction of the vehicle was 4.5 mm, whereas the variation of offset amounts of the positions (indicated by black spots) of the reaction force axes on the lower end plane in the lateral direction of the vehicle was 13.3 mm. It can be understood that the positions of the reaction force axes on the lower end plane depends mainly upon the tilt angle of the lower compression plate S1. Therefore, when the variation of the positions of the reaction force axes on the upper end plane has to be increased, the tilt angle of the upper compression plate S2 may be adjusted.

It can be understood from FIGS. 4–6 that the positions of the reaction force axes on each end plane of the compression spring 10 are shifted in a direction determined in accordance with the tilting direction of the compression plate S1, and that the shifted amount is approximately proportional to the tilt angle. In this case, variation of mounting loads and variation of spring constants in response to the variation of tilt angle of the compression plate S1 were within allowable ranges, respectively, as indicated by a table in FIG. 7.

From the result of the simulation as described above, at first, it has been confirmed that a shifting direction (offset direction) of the reaction force axis can be identified on the basis of the direction of the tilt direction of the compression plate S1. Second, the shifted amount of the reaction force axis is approximately proportional to the tilt angle of the compression plate S1. Third, even if the tilt angle of the compression plate S1 is varied, fundamental characteristics such as the mounting load and spring constants will not be influenced so much. In view of those results, the relationship between the tilt angle of the compression plate S1 and the reaction force axis is stored in the controller CT as a data base, and on the basis of the data base, appropriate tilt angles ($\theta$, $\phi$) are provided at Step 105 in FIG. 3.

In the present embodiment, it is so constituted that the reaction force axis is detected at Step 103 and the error is determined at Step 104. According to the load measuring device LM, however, magnitude and direction of a side force applied to the center of the upper end coil of the compression spring 10 can be detected. Therefore, errors of the magnitude and direction of the side force may be determined, so that the tilt angles ($\theta$, $\phi$) of the compression plate S1 may be provided on the basis of those errors. In this case, the magnitude and direction of the side force correspond to factors resulted from the shifted amount (offset amount) of the reaction force axis.

According to another embodiment of the present invention, therefore, the load measuring device LM is adapted to measure the side force and the direction thereof exerted on the formed helical compression spring 10, as the parameters to detect the reaction force axis. Then, an error between a target side force and the measured side force is determined, and an error between a target direction of the side force and the detected direction of the side force is determined. And, the tilt angle of at least one of the compression plates is provided on the basis of the errors of the side force and the direction thereof.

Figure 8:
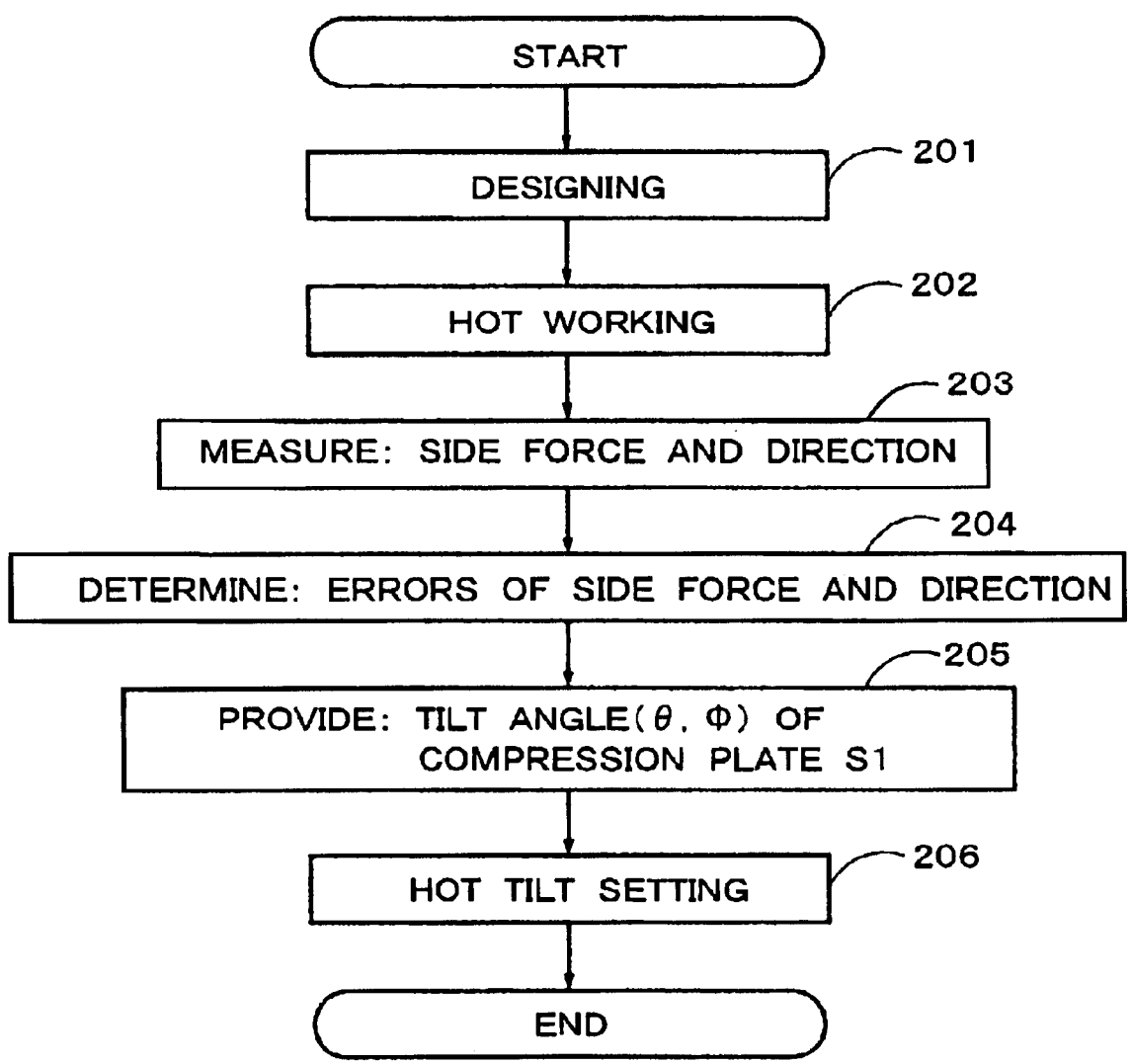
FIG. 8 is a flow chart showing a method for manufacturing a helical compression spring, including a method for setting the compression spring according to another embodiment of the present invention.

FIG. 8 shows the process for producing the compression spring according to the another embodiment, in a similar fashion to the process as shown in FIG. 3. In FIG. 8, the compression spring 10 formed by the hot working process is transferred to the load measuring device LM at Step 203, so that the compression spring 10 is pressurized between the parallel plates by a predetermined load. The side force and the direction thereof measured by the load cell LC are input to the determination block DT as shown in FIG. 1. The side force and the direction thereof are compared with the target side force and the target direction provided by the input device IN, respectively, to determine the errors between them. Then, on the basis of the errors provided at the determination block DT, the tilt angle ($\theta$ and/or $\phi$) of the compression plate S1 to the lower end plane of the compression spring 10 is provided at Step 205. The tilt angles ($\theta$, $\phi$) are set to provide the reaction force axis for canceling the errors on the basis of a data base based on a formula. The rest of Steps in FIG. 8 are substantially the same as the Steps as shown in FIG. 3, so that the explanation of them are omitted.

It should be apparent to one skilled in the art that the above-described embodiments are merely illustrative of but a few of the many possible specific embodiments of the present invention. Numerous and various other arrangements can be readily devised by those skilled in the art without departing from the spirit and scope of the invention as defined in the following claims.

What is claimed is:

1. A method for setting a formed helical compression spring, comprising:

placing the formed helical compression spring between a pair of compression plates;

tilting at least one of the compression plates by a predetermined angle to an end plane of the spring; and actuating at least one of the compression plates to pressurize the spring.

2. A method for setting a formed helical compression spring placed between a pair of compression plates, comprising the steps of:

measuring parameter to detect a reaction force axis of the formed helical compression spring, comparing a target reaction force axis of the spring with the reaction force axis detected on the basis of measured parameters to provide an error between the target reaction force axis and the detected reaction force axis;

providing a tilt angle of at least one of the compression plates tilted to an end plane of the spring, in at least one direction on a plane including a coil axis of the spring, on the basis of the error; and actuating at least one of the compression plates to pressurize the spring, with at least one of the compression plates tilted to the end plane of the spring by the tilt angle.

3. The method for setting a formed helical compression spring placed between a pair of compression plates as set forth in claim 2, wherein the measuring step, comparing step and tilt angle providing step are executed once in a predetermined number of operations of the actuating step.

4. The method for setting a formed helical compression spring placed between a pair of compression plates as set forth in claim 2, wherein the measuring step, comparing step and tilt angle providing step are executed in advance, and the actuating step is repeatedly executed.

5. The method for setting a formed helical compression spring placed between a pair of compression plates as set forth in claim 2, wherein a first tilt angle of at least one of the compression plates tilted to an end plane of the spring is provided in one direction on one plane including the coil axis of the spring, and a second tilt angle of the one of the compression plates tilted to the end plane of the spring is provided in the other direction on a plane perpendicular to the one plane, on the basis of the error, and wherein at least one of the compression plates is a actuated to pressurize the spring, with at least one of the compression plates tilted to the end plane of the spring by the first and second tilt angles.

6. The method for setting a formed helical compression spring placed between a pair of compression plates as set forth in claim 2, wherein a side force and a direction thereof exerted on the formed helical compression spring are measured, as the parameters to determine the reaction force axis, and wherein an error between the target side force and the measured side force, and an error between the target direction of the side force and the measured direction of the side force, are provided, and wherein the tilt angle of at least one of the compression plates is provided on the basis of the errors of the side force and the direction thereof.

7. The method for setting a formed helical compression spring placed between a pair of compression plates as set forth in claim 6, wherein the measuring step, comparing step and tilt angle providing step are executed once in a predetermined number of operations of the actuating step.

8. The method for setting a formed helical compression spring placed between a pair of compression plates as set forth in claim 6, wherein the measuring step, comparing step and tilt angle providing step are executed in advance, and the actuating step is repeatedly executed.

9. The method for setting a formed helical compression spring placed between a pair of compression plates as set forth in claim 6, wherein a first tilt angle of at least one of the compression plates tilted to an end plane of the spring is provided, in one direction on one plane including the coil axis of the spring, and a second tilt angle of the one of the compression plates tilted to the end plane of the spring is provided, in the other direction perpendicular to the one direction, on the basis of the errors, and wherein at least one of the compression plates is actuated to pressurize the spring, with at least one of the compression plates tilted to the end plane of the spring by the first and second tilt angles.

10. An apparatus for setting a formed helical compression spring placed between a pair of compression plates, comprising:

measuring means for measuring parameters to determine a reaction force axis of the formed helical compression spring, determination means for comparing a target reaction force axis of the spring with the reaction force axis determined by the measured parameters to provide an error between the target reaction force axis and the detected reaction force axis;

tilt angle providing means for providing a tilt angle of at least one of the compression plates tilted to an end plane of the spring, in at least one direction on a plane including a coil axis to the spring, on the basis of the error provided at the determination means; and pressure means for actuating at least one of the compression plates to pressurize the spring, with at least one of the compression plates tilted to the end plane of the spring by the tilt angle provided at the tilt angle providing means.

11. The apparatus for setting a formed helical compression spring placed between a pair of compression plates as set forth in claim 10, wherein the tilt angle providing means is adapted to provide a first tilt angle of at least one of the compression plates tilted to an end plane of the spring, in one direction on one plane including the coil axis of the spring, and a second tilt angle of the one of the compression plates tilted to the end plane of the spring, in the other direction on a plane perpendicular to the one plane, on the basis of the error provided at the determination means, and wherein the pressure means is adapted to actuate at least one of the compression plates to pressurize the spring, with at least one of the compression plate tilted to the end plane of the spring by the first and second tilt angles provided at the tilt angle providing means.

12. The apparatus for setting a formed helical compression spring placed between a pair of compression plates as set forth in claim 10, wherein the measuring means measures a side force and a direction thereof exerted on the formed helical compression spring, as the parameters to determine the reaction force axis, and the determination means provides errors between the target side force and the measured side force, and between the target direction of the side force and the measured direction of the side force, and wherein the tilt angle providing means provides the tilt angle of at least one of the compression plates on the basis of the errors of the side force and the direction thereof provided at the determination means.

* * * * *